(12) United States Patent
Sun

(10) Patent No.: US 8,613,194 B2
(45) Date of Patent: Dec. 24, 2013

(54) TRI-ENERGY POWER GENERATING DEVICE

(76) Inventor: Robert Sun, Tamuning, GU (US)

( * ) Notice: Subject to any disclaimer, the term of this patent is extended or adjusted under 35 U.S.C. 154(b) by 50 days.

(21) Appl. No.: 13/482,389

(22) Filed: May 29, 2012

(65) Prior Publication Data

US 2013/0181456 A1    Jul. 18, 2013

(30) Foreign Application Priority Data

Jan. 17, 2012    (TW) .............................. 101201070 U

(51) Int. Cl.
*F03G 7/00*    (2006.01)

(52) U.S. Cl.
USPC .......................................... 60/641.8; 290/55

(58) Field of Classification Search
USPC .......................................... 290/55; 60/641.8
See application file for complete search history.

(56) References Cited

U.S. PATENT DOCUMENTS

| | | | | |
|---|---|---|---|---|
| 4,183,378 A * | 1/1980 | Decker | ......................... | 138/149 |
| 4,481,774 A * | 11/1984 | Snook | ......................... | 60/641.14 |
| 6,352,473 B1 * | 3/2002 | Clark | ......................... | 454/19 |
| 8,276,379 B2 * | 10/2012 | Logan et al. | ............... | 60/641.14 |
| 2005/0150225 A1 * | 7/2005 | Gwiazda et al. | ............. | 60/641.1 |
| 2006/0156725 A1 * | 7/2006 | Kenessey | ................... | 60/641.12 |
| 2007/0245730 A1 * | 10/2007 | Mok | ............................. | 60/641.8 |
| 2011/0021134 A1 * | 1/2011 | Zwern | ........................... | 454/343 |
| 2011/0215583 A1 * | 9/2011 | Lee et al. | ....................... | 290/55 |

FOREIGN PATENT DOCUMENTS

| | | | |
|---|---|---|---|
| FR | 2547029 A | * | 12/1984 |
| FR | 2574863 A1 | * | 6/1986 |
| GB | 2013789 A | * | 8/1979 |
| GB | 2430982 A | * | 4/2007 |

* cited by examiner

*Primary Examiner* — Joseph Waks
(74) *Attorney, Agent, or Firm* — WPAT, P.C.; Anthony King

(57) ABSTRACT

A tri-energy power generating device uses the light energy, the thermal energy and wind energy from the nature and transfers these energies into electric power so as to obtain environmentally friendly power. The tri-energy power generating device includes a thermal energy transfer unit, a light-thermo energy collecting unit disposed above the thermal energy transfer unit and a wind turbine unit. When the wind is sufficient, the cold air enters the thermal energy transfer unit from a lower end thereof to drive the wind turbine unit. When there is sufficient sunshine, the light-thermo energy collecting unit transfers the light into electric power to initiate the wind turbine unit and transfer the light into the thermal energy. The thermal energy is conducted to the thermal energy transfer unit and the air is heated to drive the wind turbine unit to generate electric power.

8 Claims, 2 Drawing Sheets

TRI-ENERGY POWER GENERATING DEVICE

BACKGROUND OF THE INVENTION

1. Field of the Invention

The present invention relates to a power generating device, and in particular to a tri-energy power generating device using the solar energy, thermal energy and wind energy to generate environment-friendly electric power.

2. The Prior Arts

The conventional ways to generate electrical power use water, coal, wind, solar energy and nuclear energy. However, the hydroelectric power plants cost too much and the drought and flood may affect the running of the power plants. Although the fossil fuel power plants are reliable, they generate significant pollution and burning fossil fuel is major cause of global warming. Moreover, the sources of the oil, natural gas and coal for combustion are limited and the prices of them are fluctuated quite often. The wind power is renewable energy and environmentally friendly, but the amount of electricity generation is much smaller and the intermittence of wind creates problem. The solar energy is also renewable energy and environmental friendly. However, the amount of electricity generation is also small and easily affected by the weather conditions. The nuclear energy generates power effectively but the nuclear wastes contaminate the environment and the nuclear power plant has high cost.

In summary, the area with a lot of sunshine usually has less wind power, and the areas with significant wind power usually do not have sufficient sunny days. Therefore, most of the areas cannot have both the wind power and the solar power. Besides, the wind power and the solar power provide only limited electric power due to the low efficiency and high manufacturing cost.

SUMMARY OF THE INVENTION

A primary objective of the present invention is to provide a power generating device which uses the wind energy, the solar energy and the thermal energy so as to improve conventional power generating devices.

The present invention uses and combines the solar energy, the thermal energy and wind energy from the nature to transfer these energies into electric power so as to obtain environment-friendly power. A tri-energy power generating device according to the present invention includes a thermal energy transfer unit, a light-thermo energy collecting unit disposed above the thermal energy transfer unit and a wind turbine unit. When the wind is sufficient, the cold air enters into an inner tube of the thermal energy transfer unit from the lower end of the inner tube to drive a generator of the wind turbine unit. When there is sufficient sunshine, the light-thermo energy collecting unit transfers the light into electric power to initiate the running of the generator and transfer the light into the thermal energy. The thermal energy is conducted to the thermal energy transfer unit which generates air flow to drive the wind turbine unit to generate electric power by heat exchange.

The tri-energy power generating device according to the present invention comprises a thermal energy transfer unit, a light-thermo energy collecting unit and a wind turbine unit. The thermal energy transfer unit has an outer tube, an inner tube and a plurality of heat conductive tubes. A diameter of the outer tube is larger than that of the inner tube and the inner tube is located in the outer tube. The heat conductive tubes are located between the outer and inner tubes. The heat conductive tubes, the outer tube and the inner tube are vertically set up and located longitudinally relative to each other. A passage is longitudinally defined through the inner tube. The light-thermo energy collecting unit is located above the thermal energy transfer unit and has a light focusing and heat collecting member which is in contact with the outer and inner tubes. The wind turbine unit is located within a range of the inner tube.

Preferably, the heat conductive tubes are in contact with the outer and inner tubes so as to obtain the optimal heat conducting result.

Preferably, the light-thermo energy collecting unit may further include a convex lens which is located above the light focusing and heat collecting member to increase the efficiency for collecting the thermal energy.

Preferably, the light focusing and heat collecting member has a concave surface so that the thermal energy of the sunbeams is collected by the concave surface.

Preferably, the light-thermo energy collecting unit has a box having a plurality of faces and at least one face has solar panels connected thereto. The solar panels are as many as possible to collect more solar energy. The solar panels of the box are connected to and provide power to the wind turbine unit.

Preferably, the wind turbine unit has two wind turbines which are connected in series and can mutually drive each other. One of the two wind turbines is a permanent-magnetic generator having a permanent-magnetic windmill and an armature.

Preferably, the wall of the outer tube may further include a vacuum isolation portion to prevent the thermal energy from being transferred out of the thermal energy transfer unit and ensure that the heat exchange in the inner tube is maintained to generate wind to drive the generator.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
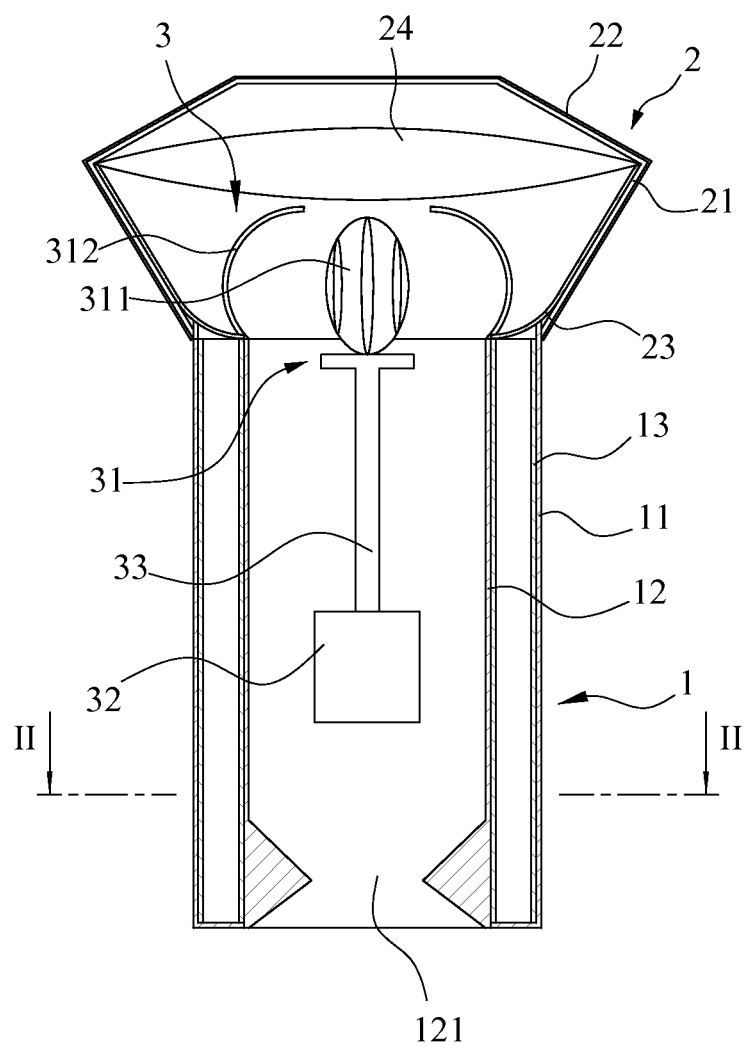
FIG. 1 is a cross sectional view showing a tri-energy power generating device in accordance with the present invention.
Figure 2:
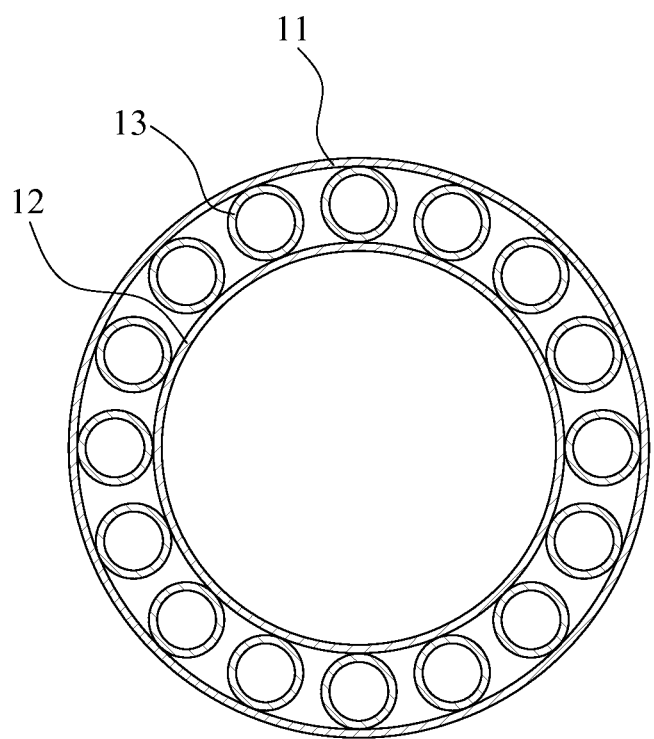
FIG. 2 is a cross sectional view taken along line II-II in FIG. 1.

With reference to the drawings and in particular to FIGS. 1 and 2, a tri-energy power generating device in accordance with a preferred embodiment of the present invention comprises a thermal energy transfer unit 1, a light-thermo energy collecting unit 2 and a wind turbine unit 3. The thermal energy transfer unit 1 has an outer tube 11, an inner tube 12 and a plurality of heat conductive tubes 13. A diameter of the outer tube 11 is larger than that of the inner tube 12. The inner tube 12 is located in and coaxially disposed with the outer tube 11. The heat conductive tubes 13 are located between the outer tube 11 and the inner tube 12, and walls of the heat conductive tubes 13 are in contact with the outer tube 11 and the inner tube 12. The heat conductive tubes 13, the outer tube 11 and the inner tube 12 are vertically set up and located longitudinally relative to each other. A passage longitudinally defined through the inner tube 12 and upper and lower ends of the inner tube 12 are open ends. The lower ends of the heat conductive tubes 13 and the outer tube 11 are closed or open ends. The wall of the outer tube 11 may further include a vacuum isolation portion (not shown in the drawings) so as to prevent the thermal energy from being transferred out of the outer tube 11 to the exterior environment, and to ensure that the heat exchange in the inner tube 12 is maintained to form air flow to drive the wind turbine unit 3. The inner tube 12 includes a neck portion 121 defined in the inner periphery of the lower portion thereof to increase the speed of the air stream when passing through the neck portion 121.

The light-thermo energy collecting unit 2 has a box 21. The box 21 includes a plurality of faces which form a honeycomb shape structure to enhance structural strength of the box 21. The upper end of the outer tube 11 of the thermal energy transfer unit 1 is connected with the lower end of the box 21 and a convex lens 24 is located at an upper portion of the box 21. At least one face of the box 21 includes solar panels 22 connected to the outside thereto. The solar panels 22 are preferred to cover as many faces of the box 21 as possible and therefore are capable of collect more solar energy. The box 21 has at least one light focusing and heat collecting member 23 connected to the inside of the box 21 and disposed below the convex lens 24. The light focusing and heat collecting member 23 is in contact with the upper ends of the outer tube 11 and the inner tube 12. Preferably, the light focusing and heat collecting member 23 has a concave surface, such as a bowl-like circular disk member. When the sun beams penetrate through the transparent mask disposed at the top of the box 21 and the convex lens 24 disposed at the upper portion of the box 21, the light are focused onto the light focusing and heat collecting member 23. The light focusing and heat collecting member 23 then conducts the thermal energy to the upper ends of the outer tube 11 and the inner tube 12. The outer tube 11 and the inner tube 12 then conduct the thermal energy to the heat conductive tubes 13 and then the thermal energy is conducted to the lower ends of the outer tube 11, the inner tube 12 and the heat conductive tubes 13. Because the hot air would move upward, the air in the inner tube 12 is heated and flows upward.

The wind turbine unit 3 is disposed within the range of the inner tube 12 and comprises a first generator 31 and a second generator 32 which is located below the first generator 31. The first generator 31 and the second generator 32 are connected in series by a shaft 33 and the shaft 33 is connected between the first generator 31 and the second generator 32. The first generator 31 and the second generator 32 can drive each other. The first generator 31 has a permanent-magnetic windmill 311 and an armature 312 located around the permanent-magnetic windmill 311 to form a permanent-magnetic generator. The first generator 31 is electrically connected to the solar panels 22. The solar panels 22 absorbs the light, transfers the light into electric power and then provide the electric power to initiate the first generator 31.

When there is sufficient wind, the cold air enters the inner tube 12 from the lower end thereof and passes through the neck portion 121 so that the speed of the air stream is increased to rotate the permanent-magnetic windmill 311 of the first generator 31. The armature 312 and the rotating permanent-magnetic windmill 311 are cooperated to each other to generate electric power. The rotation of the permanent-magnetic windmill 311 also drives the second generator 32 to generate electric power via the shaft 33. When there is sufficient sunshine, the sun beams enter the box 21 of the light-thermo collecting unit 2 and the convex lens 24 focus the sun beams onto the light focusing and heat collecting member 23. The light focusing and heat collecting member 23 transfers the solar energy into the thermal energy. The thermal energy is conducted from the light focusing and heat collecting member 23 to the upper ends of the outer tube 11 and the inner tube 12 and then to the heat conductive tubes 13. The thermal energy is then conducted downward to the lower ends of the outer tube 11, the inner tube 12 and the heat conductive tubes 13. The air in the inner tube 12 is heated to flow upward and drives the permanent-magnetic windmill 311 of the first generator 31 to rotate. The rotating permanent-magnetic windmill 311 and the armature 312 are cooperated to each other to generate electric power. The rotation of the permanent-magnetic windmill 311 also drives the second generator 32 to generate electric power via the shaft 33. In the mean time, the solar panels 22 can transfer the solar energy into the electric power. The power needed to initiate running the first generator 31 is provided by the solar panels 22. The thermal energy transfer unit 1 and the light-thermo energy collecting unit 2 are simultaneously operated when the wind and sunshine are sufficient to generate power effectively.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A power generating device, comprising:
   a thermal energy transfer unit having an outer tube, an inner tube and a plurality of heat conductive tubes, a diameter of the outer tube being larger than that of the inner tube, the inner tube being located in the outer tube, the heat conductive tubes located between the outer and inner tubes, the heat conductive tubes, the outer tube and the inner tube located longitudinally relative to each other, a passage longitudinally defined through the inner tube;
   a light-thermo energy collecting unit located above the thermal energy transfer unit and having a light focusing and heat collecting member which is in contact with the outer and inner tubes; and
   a wind turbine unit located within the inner tube.

2. The power generating device as claimed in claim 1, wherein the inner tube includes a neck portion defined in an inner periphery of a lower portion of the inner tube.

3. The power generating device as claimed in claim 1, wherein the heat conductive tubes are in contact with the outer and inner tubes.

4. The power generating device as claimed in claim 1, wherein the light-thermo energy collecting unit comprises a convex lens which is located above the light focusing and heat collecting member.

5. The power generating device as claimed in claim 1, wherein the light focusing and heat collecting member comprises a concave surface.

6. The power generating device as claimed in claim 1, wherein the light-thermo energy collecting unit includes a box having a plurality of faces, at least one face of the box has solar panels connected thereto, and the solar panels of the box are electrically connected to the wind turbine unit.

7. The power generating device as claimed in claim 1, wherein a wall of the outer tube includes a vacuum isolation portion.

8. The power generating device as claimed in claim 1, wherein the wind turbine unit includes two wind turbines which are connected in series and mutually drive each other, one of the two wind turbines includes a permanent-magnetic generator having a permanent-magnetic windmill and an armature.

* * * * *